(No Model.)
W. ROBINSON.
LUBRICATOR FOR JOURNALS.
No. 326,156. Patented Sept. 15, 1885.
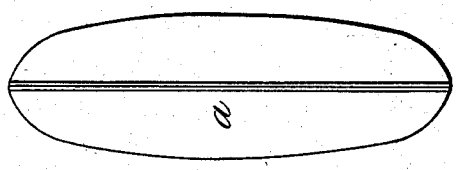
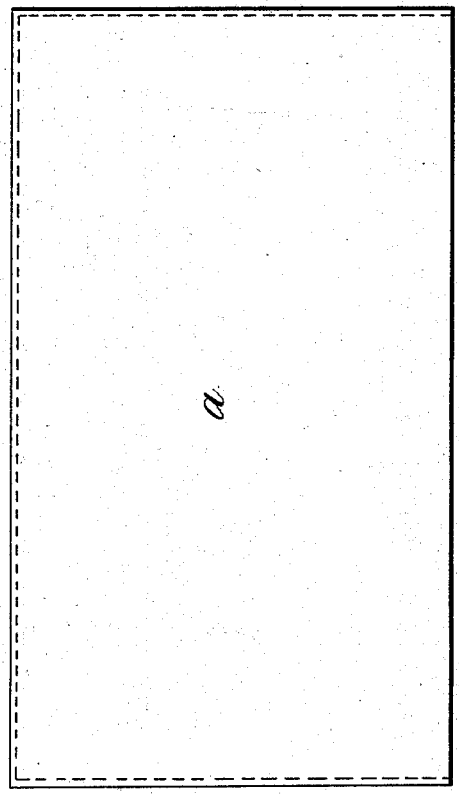

UNITED STATES PATENT OFFICE.

WILLIAM ROBINSON, OF MIDDLESBROUGH-ON-TEES, ENGLAND.

LUBRICATOR FOR JOURNALS.

SPECIFICATION forming part of Letters Patent No. 326,156, dated September 15, 1885.

Application filed May 11, 1885. (No model.) Patented in England April 29, 1884, No. 6,967, and in Belgium April 27, 1885, No. 68,659.

*To all whom it may concern:*

Be it known that I, WILLIAM ROBINSON, a subject of the Queen of Great Britain and Ireland, residing at Middlesbrough-on-Tees, Kingdom of Great Britain and Ireland, have invented a new or Improved Lubricator for Journals and Bearings, (for which I have obtained a patent in Great Britain, No. 6,967, bearing date April 29, 1884,) of which the following is a specification.

This invention is designed to economize any kind of lubricant—such as grease—by insuring that all the lubricant shall be actually utilized in lubrication, and that it shall be kept clean and free from foreign matter—such as loose shale, grit, and the like. To this end, according to my invention, the lubricant is inclosed in a bag of any suitable porous material, made in any required shape or form, according to the situation wherein it is intended to be used. By thus inclosing the main body of lubricant, if journals have to be changed, the bags, with their inclosed lubricant, can be removed and put back or reapplied when the change has been effected, and, moreover, a large saving of labor and attention is effected, as compared with the ordinary method of lubricating.

In the accompanying sheet of illustrative drawings, Figure 1 is a side view of a bag containing lubricant—as, for example, grease; and Fig. 2 is an end view of the same.

*a* is the bag or receptacle of porous material—such as canvas—filled through one end with lubricant, such end being afterward closed by sewing. When a bag thus filled with lubricant is to be used it is placed in the plumber-block or bearing or stuffing-box of journal or part to be lubricated, so that the same shall work in contact with the lubricating-bag. The number and arrangement of lubricating bags used to lubricate a given journal or other moving part will depend upon its size and form.

What I claim is—

A lubricator for journals and bearings, consisting of a closed bag composed of porous material—such as canvas—within which a lubricant—such as grease—is inclosed and confined, whereby the action of the moving part against the said bag forces the lubricant through the pores thereof, substantially as described.

WILLIAM ROBINSON.

Witnesses:
J. R. STUBBS,
*Middlesbrough-on-Tees, England, Notary Public.*
T. A. BLAND,
*His Clerk.*